June 13, 1933. H. H. BARBER 1,913,653
POWER TRANSMISSION MECHANISM FOR PORTABLE CONVEYERS
Filed May 11, 1931 3 Sheets-Sheet 1
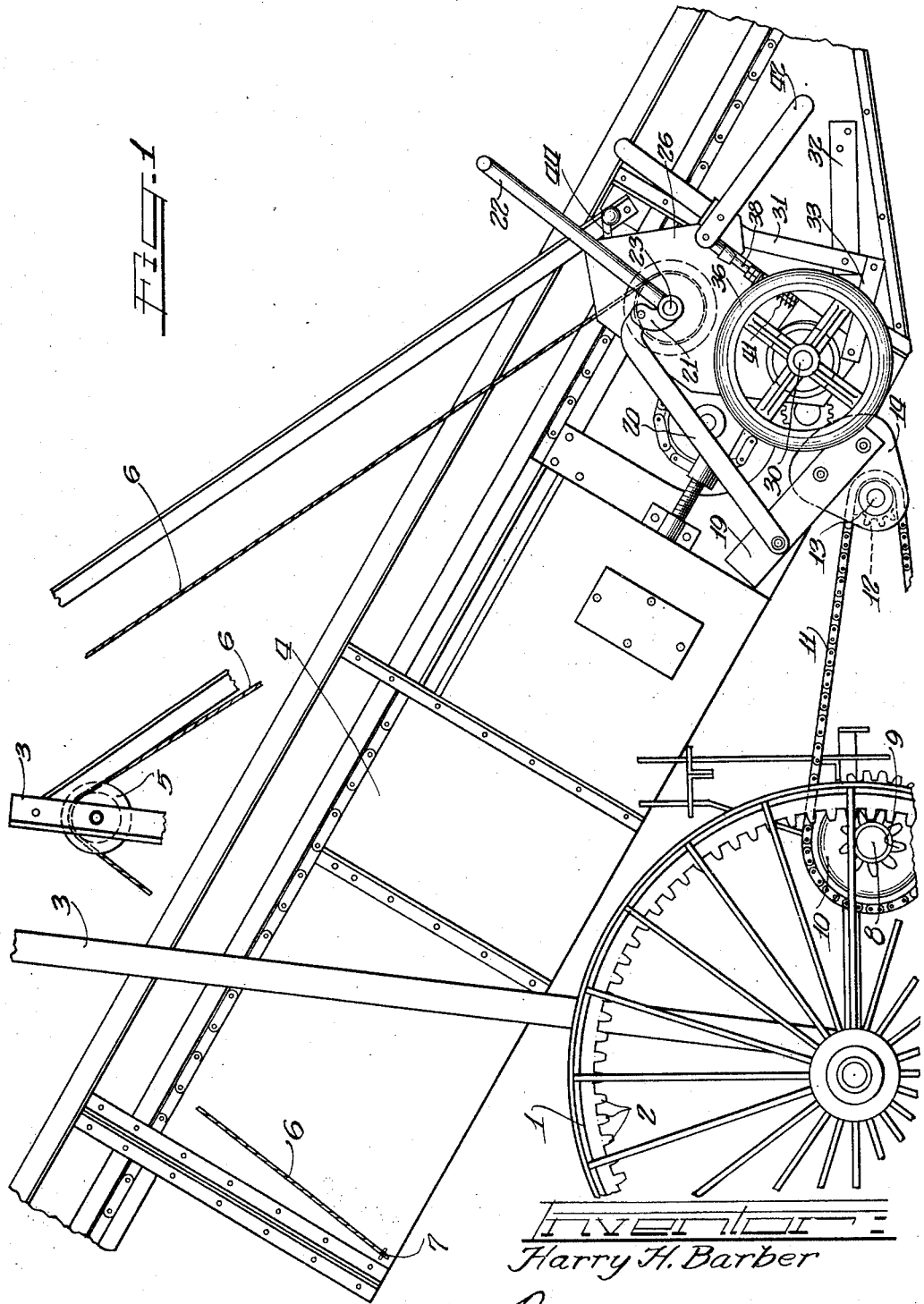

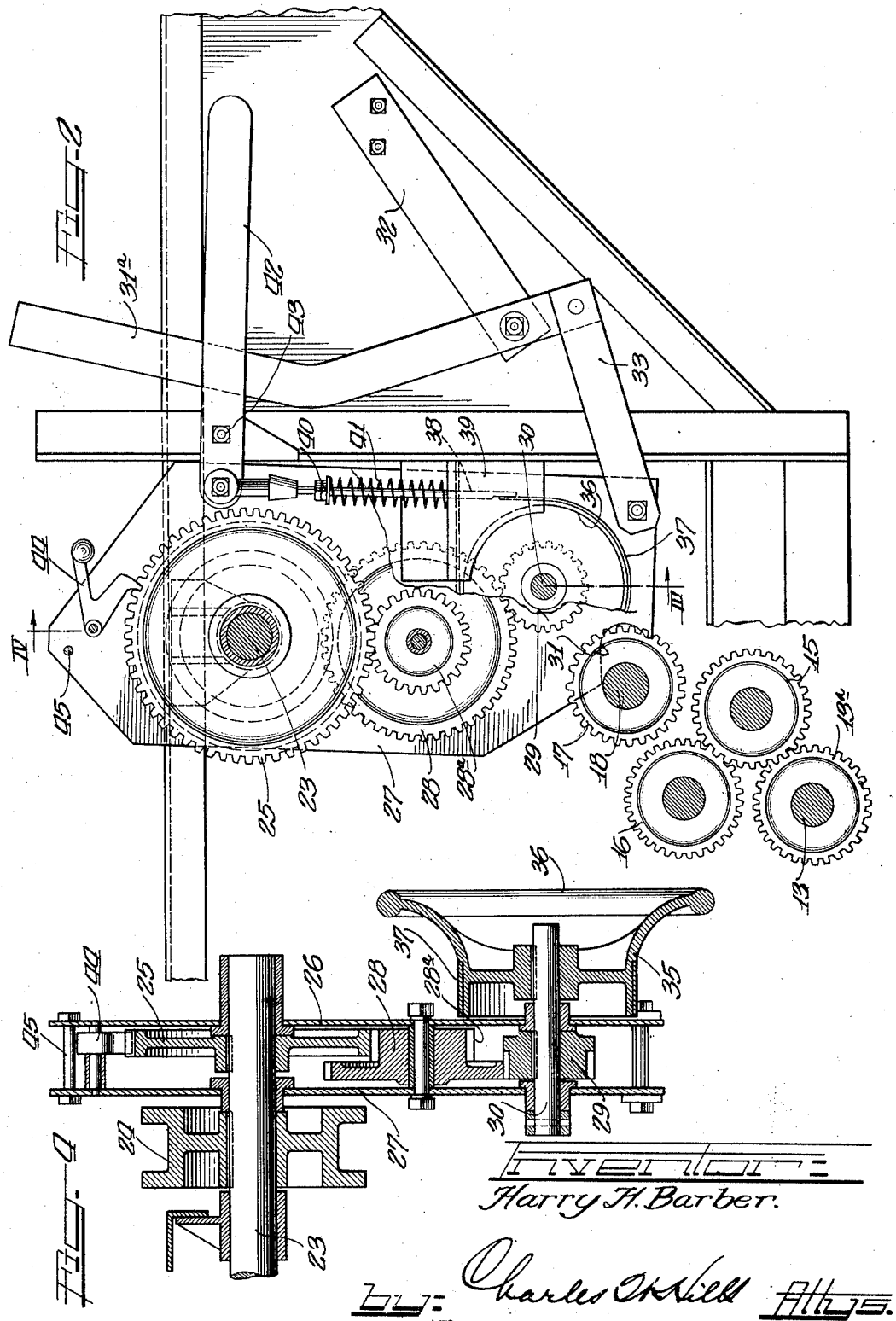

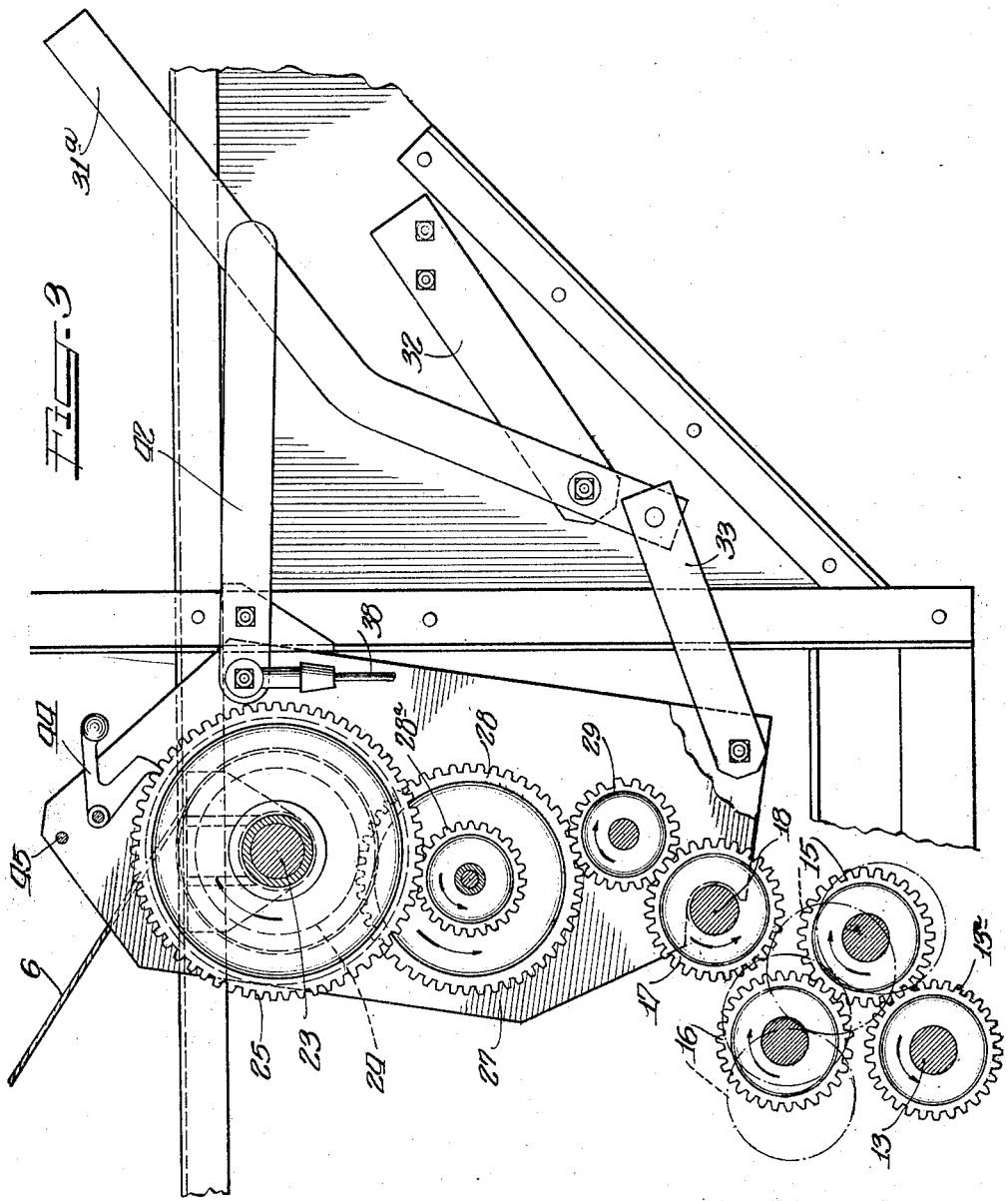

Patented June 13, 1933

1,913,653

UNITED STATES PATENT OFFICE

HARRY H. BARBER, OF AURORA, ILLINOIS, ASSIGNOR TO BARBER-GREENE COMPANY, OF AURORA, ILLINOIS, A CORPORATION OF ILLINOIS

POWER TRANSMISSION MECHANISM FOR PORTABLE CONVEYERS

Application filed May 11, 1931. Serial No. 536,513.

This invention relates to power transmission for a portable conveyer for controlling the forward and backward movement of the conveyer and controlling the elevating and lowering movement of the boom.

The invention comprises the novel structure and combination of parts hereinafter described and more particularly pointed out and defined in the appended claims.

In the accompanying drawings which illustrate a preferred form of this invention and in which similar reference numerals refer to similar features in the different views covered:

Figure 1 is an enlarged fragmentary side elevational view of a portable conveyer embodying this invention.

Figure 2 is a part sectional and part elevational view illustrating parts of a transmission mechanism.

Figure 3 is a view substantially similar to Figure 2 illustrating the manner of adjusting the gears for forward and reverse drive.

Figure 4 is an enlarged sectional view taken upon the line 4—4 of Figure 2.

Referring to Figure 1, it will be noted that the portable conveyer consists of a pair of traction wheels 1 having internal gear teeth 2. A bifurcated mast 3 extends from the bolster or framework carried by the axle of the truck wheels 2 for supporting the boom 4. The boom 4 is supported upon the mast 3 by means of suitable block and tackle which consists of pulleys 5 at the top of the mast over which the cables 6 are trained. These cables are attached to the boom as indicated at 7. It might be mentioned that there are two cables, one on each side of the boom. This invention concerns itself more directly with the transmission mechanism for propelling the conveyer forwardly or backwardly and raising or lowering the boom.

The framework on the truck wheels supports a driving shaft 8 which is equipped with pinions 9 which mesh with the internal gears 2 upon the truck wheels. The shaft 8 has a sprocket wheel 10 keyed thereon. A sprocket chain 11 is trained over the sprocket gear 10 and over a small sprocket 12 which is secured upon a shaft 13. It will be obvious that if the shaft 13 is driven in one or the other direction, the conveyer will be propelled in one direction or the other. The mechanism for propelling the shaft 13 in one direction or the other is best illustrated in Figures 2 and 3. Before proceeding with the description of the driving mechanism, it is desired to state that a gear casing 14 is pivotally mounted upon the shaft 13 for oscillating movement as shown in Figure 1. This gear casing 14 carries a pair of gears 15 and 16 as shown in Figures 2 and 3. The gear 15 is always in mesh with a gear 13a secured upon the shaft 13. In the full line position of the gears as shown in Figure 3, the gears 15 and 16 are in their neutral position, however, if the casing is swung to the left as viewed in Figure 3 to bring the gear 15 into mesh with the driving gear 17 on the power shaft 18, the shaft 13 will be rotated for propelling the vehicle in a rearward direction. On the other hand, if the casing 14 is swung to the right as viewed in Fig. 3 to bring the gear 16 into mesh with the driving gear 17, the shaft 13 will be driven in a forward direction. These different positions of the gears are indicated in dotted lines in Fig. 3.

The mechanism for swinging the casing 14 upon the shaft 13 as a pivot is best illustrated in Fig. 1 and in referring to this figure, it will be noted that an arm 19 is rigidly secured to one side of the casing 14 and this arm 19 is connected with a link 20 which in turn is connected to a curved crank arm 21 rotatably mounted upon a shaft 23 which arm in turn is actuated by a lever 22. When the lever 22 is swung to the right for oscillating the casing 14 to the right for forward driving, it will be noted that the pivotal connection of the link 20 with crank 21, will be beyond dead center whereby the gears 16 and 17 are firmly held in mesh for operation. It might be mentioned that when the lever 22 is swung in the opposite direction for bringing gears 15 and 17 into mesh for reverse, it is necessary for the operator to hold the same in mesh by the lever 22 for as soon as the same is released the gears 15 and 17 will separate since they contact upon points upon a cord slightly less than the diameter so that there will be a squeezing out action as the gears are driven. In other words, there is always a tendency for the gears 15 and 17 to separate due to action of the driving force.

The mechanism for controlling the raising and lowering of the boom through the instrumentality of the aforementioned cables 6 will now be set forth: The cables 6 are wound around two drums 24 which are secured upon the shaft 23. One of these drums is shown in Fig. 4. The shaft 23 has a gear 25 secured thereon. A casing consisting of a pair of plates 26 and 27 is pivoted upon suitable bearings upon the shaft 23 for swinging movement. The gear 25 is housed within the casing formed by the plates 26 and 27 as clearly shown in Fig. 4, and within the casing there is journaled a gear 28 that meshes with a small pinion 29 which is geared upon a shaft 30 journaled in the casing. The plate 27 that constitutes a part of the aforementioned housing is provided with a suitable recess 31, Figure 2 to receive the power shaft 18 when the casing is swung to the left. This recess not only allows the casing to be swung but also limits the swinging movement thereof to bring the gear 29 into mesh with the gear 17 upon the power shaft 18. Mechanism has been provided for swinging the gear casing just described. The illustrated embodiment of this leverage mechanism consists of a lever 31a which is pivoted a small distance above its lower end upon a bracket 32 and is connected by a link 33 with the casing referred to. In Figure 2, the gear 29 is shown in its neutral position and disengaged from the gear 17. However, when the gear casing referred to is swung to the left by the mechanism just described, the casing will be shifted to the left as shown in Fig. 3 for bringing the gear 29 into mesh with the power gear 17. As the gear 29 is caused to rotate by the power shaft 18, it will drive the train of gears connected to the drum shaft as will presently appear. This train of gears which connects the gear 29 with the drum 24 consists of the aforementioned gears 28 and 25. It will be noted that the gear 28 has a small hub gear 28a concentric therewith which drives the gear 25. Consequently, when the hoisting gear casing is swung into the position shown in Figure 3, the train of gears 25, 28 and 29 will be driven by the power shaft 18 for rotating the drum shaft 23 for winding up the cable 6 and elevating the conveyer boom. It will be appreciated that there is always a pull upon the cable 6 tending to rotate the shaft 23 counterclockwise with the result that as soon as the operator releases the lever 31a, the hoisting gear casing will be swung to the right to disengage the pinion 29 from the driving gear 17. It might be mentioned that the anticlockwise rotation of the power gear 17 has a tendency to hold gear 29 in meshing relation therewith upon points of a chord less than the diameter. However, this tendency is overcome by the pull of the cables 6 when the lever 31a is released. A manually controlled pawl 44 is pivoted in the upper portion of the hoisting gear casing and is normally in engagement with the gear 25 for preventing reverse rotation thereof.

The aforementioned shaft 30 has a brake drum 35 keyed thereon which is provided with a hand wheel 36. A brake band 37 surrounds the drum 35 and is connected to a rod 38 which passes through an aperture in the top of the casting 39 secured to the framework. The upper portion of the rod 38 is provided with a collar 40 and a coiled spring 41 is positioned between the casting 39 and the collar 40 for normally exerting tension upon the brake band.

The upper end of the rod 38 is pivoted to one end of a lever 42 which is pivoted intermediate its end as indicated at 43 to the framework of the conveyer. When the lever 42 is elevated, the rod 38 will be forced downwardly and the tension of the spring 41 will be overcome for releasing the brake band. The release of the brake band 27 will allow the pull of the cable on the shaft 23 to rotate the train of gears 25, 28 and 29 as the boom descends by gravity. Of course, as soon as the boom has been sufficiently lowered, the operator will release the lever 42 and allow the spring 41 to again apply the brake band to the drum and prevent further rotation of the gears. It will, of course, be understood that before the lever 42 is operated for releasing the brake band, it will be necessary to manually disengage the pawl 44. This may be done by merely grasping the handle of the pawl and swinging the same upwardly against the stop 45. In case the pawl should be tightly engaged with the gear 25 and there should be some difficulty in disengaging the same, the handwheel 36 may be rotated by hand for rotating the train of gears a slight fraction of an inch or so for releasing the pressure upon the pawl 44.

From the foregoing description, it will be obvious that the control for the portable conveyer consists of a power shaft which in the drawings is indicated by the reference 18 and which may be driven by a motor or any suitable kind of power. In connection with this driving element there is a swingable gear unit for controlling the propulsion of the conveyer and a second swingable gear unit for controlling the hoisting or lowering of the boom. It will be appreciated that both of these units may be put into operation from the same location at the front end of the boom by a single individual. The position of the boom and the location of the conveyer can be readily adjusted in a very simple manner by an attendant standing near the base of the boom.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a portable conveyer, a driven element, a boom, means including a train of gears for elevating the boom, means for swinging said gears into and out of engagement with said driven element, a pair of traction wheels, driving mechanism therefor including a gear train swingable into and out of engagement with said driven element.

2. In a portable conveyer, a power driven element, a driving mechanism for said conveyer comprising a gear unit swingable into engagement with said driving element for propelling said conveyer forwardly or reversely, a boom and hoisting mechanism for said boom including a gear train swingable into engagement with said driven element.

3. In a portable conveyer, a power driven element, a boom, hoisting mechanism therefor including a cable and a drum, a swingable gear train connecting said drum and power driven element, means for swinging said gear train into engagement with said power driven element and maintaining the same in engagement therewith, the parts being so constructed and designed that the power upon the cable will swing said gear train out of engagement with the power driven element upon release of said means.

4. In a portable conveyer, a boom, hoisting mechanism therefor including cable means and a drum, a power driven element, a train of gears for operating said drum and swingable into engagement with said power driven element, means for maintaining said train of gears in engagement with said power driven element, the pull upon said cable means normally swinging said gear train out of engagement with said power driven element upon release of said means.

In testimony whereof I have hereunto subscribed my name at Aurora, Kane County, Illinois.

HARRY H. BARBER.